Dec. 26, 1933.   W. C. PITTER   1,940,880
SPRING CLUTCH
Filed Dec. 20, 1930   2 Sheets-Sheet 1

Inventor
Walter Charles Pitter
By Luther Johns
Atty.

Dec. 26, 1933.  W. C. PITTER  1,940,880
SPRING CLUTCH
Filed Dec. 20, 1930  2 Sheets-Sheet 2

Inventor
Walter C. Pitter
By Luther Johns
Atty.

Patented Dec. 26, 1933

1,940,880

UNITED STATES PATENT OFFICE 1,940,880

SPRING CLUTCH

Walter Charles Pitter, Epping, England, assignor to The Pitter Trust, Chicago, Ill., a common-law trust Application December 20, 1930
Serial No. 503,671

5 Claims. (Cl. 192—41)

These improvements relate to rotating shaft clutches of the type in which a coiled spring carried by one main member fits within or upon the other main member and through the expansion or contraction of the spring, as the construction may be, the two members become locked in driving and driven relation respectively in one direction of the driving shaft's rotation.

Clutches of the type referred to are well known at this time. In the old forms with which I am familiar the coiled spring is of cylindrical shape. Since the coil has screw-thread properties the rotative movement of either one of the members relative to the other in what may be called the unthreading direction tends to cause the spring to become smaller in diameter and driving power is not developed. If, however, the relative rotative movement by either member is in the threading direction the spring tends to enlarge and the binding effect between the two members is had. When the driving power ceases the driven member may continue to rotate. Either of the main members may be the driving or the driven member.

While such spring clutches are being extensively used they are not entirely satisfactory in many instances because of the slippage that takes place before the clutching action occurs. In various uses of a clutch it is highly important that its action be substantially instantaneous with the application of power. In all cases it should be reliable.

The prime object of the present invention is to render such spring clutches reliable and substantially instantaneous in action. More specific objects are to provide means for these purposes which are simple, easily to be incorporated or otherwise embodied, and which may constitute parts or features of a unitary clutch mechanism.

In the drawings Figure 1 is a medial longitudinal sectional view through a clutch embodying these improvements in what I shall herein call the preferred form;

Figure 1:
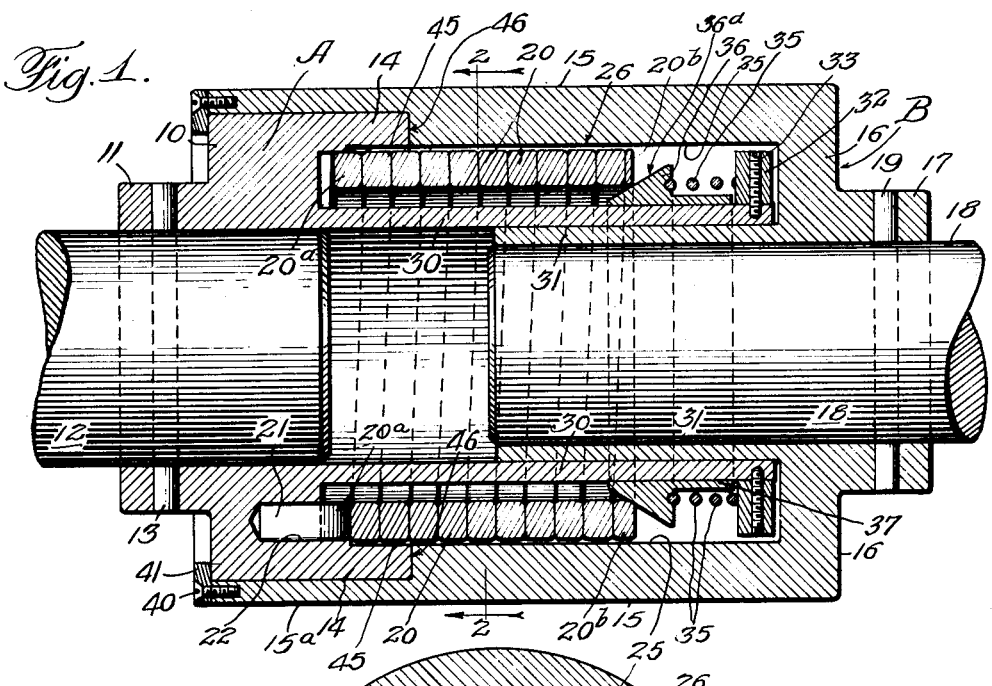
Figure 2:
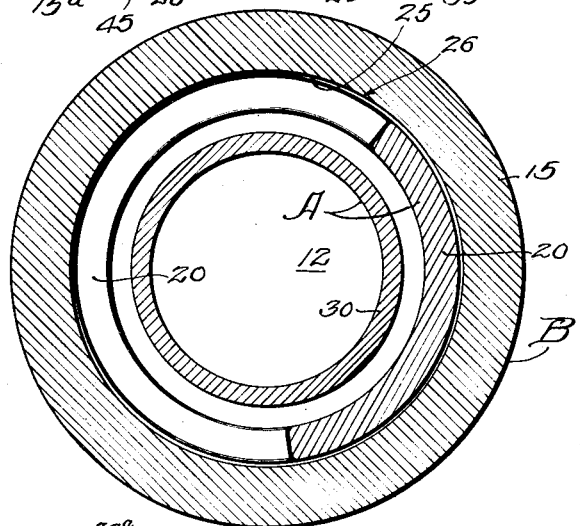
Fig. 2 is a cross section on the line 2—2 of Fig. 1.
Figure 3:
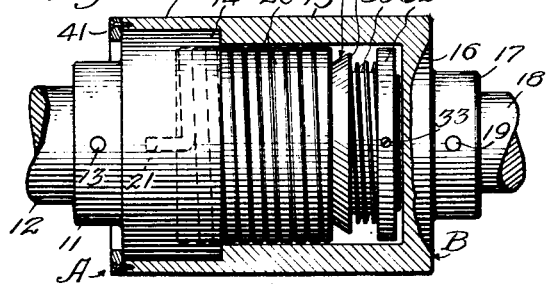
Fig. 3 is a smaller view with the recessed member partly in section as in Fig. 1 and, at the right, partly otherwise broken away.

The clutch illustrated in Figs. 1, 2 and 3 comprises two main members A and B. Member A comprises a hub 10 having a flange 11 into which shaft 12 extends and to which shaft the hub may be secured in any approved way, as by a through pin 13. Member A has another flange portion 14 in abutting and interfitting relation with a part of the shell-like portion 15 of member B. Member B has an end wall 16 and a flange 17 fitting upon shaft 18 and held by any approved means as by the pin 19.

Member A carries a coil spring 20, the inner turn 20a of which has its end 21 turned over at right angles and seated in a hole 22 in member A. Several of the turns of the coil are within flange 14.

The inner wall 25 of member B defines a cylindrical recess, and the spring coil 20 has its outer periphery cylindrical and fits fairly snugly into the recess. The drawings show a slight space 26 between the coil and wall 25. This spacing at 26 is exaggerated for clearness of illustration, but a slight spacing actually exists there in practice, for one reason because of the film of oil between these parts. In normal construction there is what would be called a running fit between the coil and the recess wall as 25 and therefore the space marked 26 may be considered to be of the small order of several thousandths of an inch.

The device as thus far specifically described may be considered to be old, except for constructional features, and its action would be as follows:

Let us suppose shaft 12 to be the driving shaft and to be turning in the clockwise or screw-threading direction as viewed in Fig. 2. There is frictional resistance over the whole body of the spring tending to cause it to lag and thereby to expand. Whether there is immediate locking from this expansion or whether a wave of expansion runs rapidly from the inner turn 20a of the spring to its free end I have not determined; but I believe there is immediate locking expansion followed by a wave of still more positive expansion force. If shaft 18 were the driving shaft and turning in the anti-clockwise direction as the device as viewed in Fig. 2 the action would be the same.

The chief difficulty with the old construction thus far specifically described is with respect to the slippage that occurs in getting the expansion of the spring started, and this is sometimes very considerable. It is also very erratic—sometimes more and sometimes less, and developing at various intervals of time. It happens too that in certain relations of one member to the other slippage is more pronounced than in other relations, probably due to inequalities in wear or in the manufacture. For even ordinary results the parts must be fitted together with considerable precision.

Turning now to the features which distinguish the present clutch from older forms I provide an inner flange-like extension or support 30 which is integral with hub 10 of member A. This part 30 is not an essential feature, but by making this support 30 in the form of a sleeve I can provide a longer and stronger support for shaft 12 and also for shaft 18 through the similar hollow sleeve-like extension 31 integral with hub 16 of member B. This construction provides a bearing between the sleeve-like extensions 30 and 31 of such nature as to give the device a certain desirable strength and strongly maintains the axial relations.

At the end of sleeve 30, I provide a stop in the form of a collar 32 held by a set screw 33. Next there is a conically-shaped ring 36 having a sleeve-like part 37 bearing on support 30, and between the stop 32 and the head 36 of member 36—37 there is a coiled expansion spring 35 tending to force the slanting and wedging surface 36a into expanding relation with at least the first turn 20b of the spring, and this free end turn as 20b is thus normally and yieldingly forced more closely into contact with the wall 25 defining the main recess in member B.

The effect of this expanding action of the means 36—37 and the spring 35 is such that immediately upon the application of force by either of the shafts in a driving direction friction is developed at the free end of the last coil of the spring. It would appear that a wave of expansion would run from the free end to the rear end of the spring, and it is conceivable also that such a wave would simultaneously run in the opposite direction. The result, in any event, is that a locking expansion of the spring develops substantially instantly. The provision of means independent of the main spring 20 for initiating the expansion makes for certainty and immediacy of action.

The pressure of spring 35 is slight, as but little pressure is needed to bring about the desired co-action, especially when the last turn as 20b of the spring is cut away and finished off to produce a construction in which the extreme outer face of the spring is substantially at right angles with the axis, thus reducing the width and therefore the inherent resistance of that turn, and notably at the free end portions of the last turn, to outward or expansive movement. An exceedingly slight outward movement of this free end turn starts the action.

By mounting these means which include the parts 36—37 and the spring 35 on a support carried by the same member, as A, which carries the main spring 20, I provide a unitary organization of member A in such form that it may be inserted bodily into the recess of member B. The sleeve 30 serves this purpose. The construction is such that members A and B form a unitary clutch mechanism which may be applied at the ends of respective shafts where one is to be driven by the other.

The construction as thus far described would permit members A and B to be separated from each other by merely drawing them apart, which is not objectionable in various uses. In order, however, that the parts A and B may not be separated inadvertently, and to insure the proper coaction between the head 36 and the free end of the spring, while further strengthening the construction and maintaining a constantly co-axial relation of the two members, I may extend the shell 15 at 15a in the form of a bearing surrounding the cylindrical outer surface of hub 10, and apply a bearing ring 41 to this extension 15a, as by screws 40. Where the extension 15a is employed the inner sleeve-like extension 31 of member B would ordinarily be omitted, although it may still be retained with advantage.

By relieving the flange 14 at the annular space 45 to provide there the same internal diameter as that of inner surface 25 I obtain the benefit, otherwise lost, of one or more turns at the inner end portion of coil 20 for locking the members A and B together. Explaining this, I may point out that when the spring expands it does so against flange 14 as well as against shell 15, and by relieving member 14 at 45, I obtain the full benefit of the turn or turns which cross the joint at 46 due to the angle of the spiral. This effects a saving in coil turns or provides a better gripping action with a given number of turns.

Figure 4:
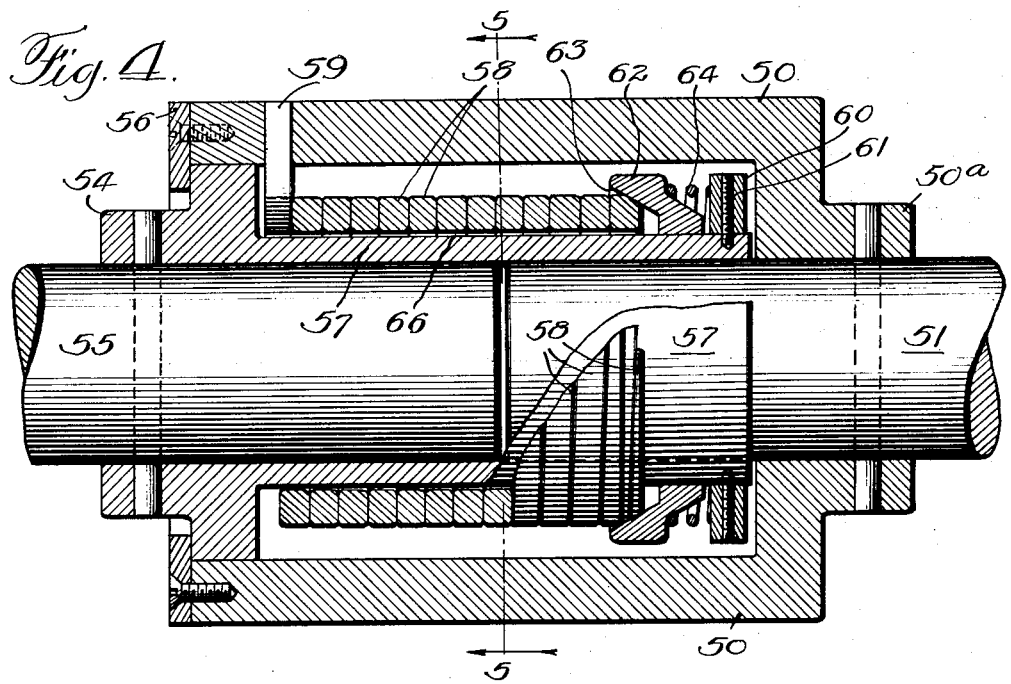
Fig. 4 is a medial longitudinal section similar to Fig. 1 and showing a modified form.
Figure 5:
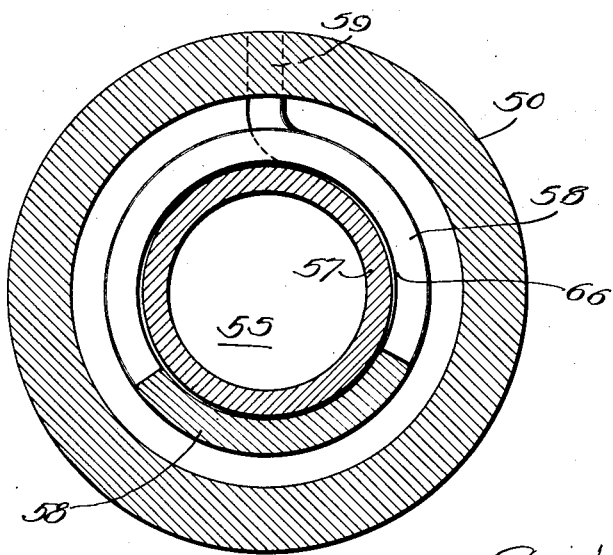
Fig. 5 is a cross section on the line 5—5 of Fig. 4.

Turning to Figs. 4 and 5 the outer member 50 is a cylindrical shell-like structure having a hub 50a rigidly secured to shaft 51. The inner member includes a hub part 54 rigidly secured to shaft 55. The ring 56 holds the inner and outer members together for ready separability.

The inner member has a cylindrical tube-like extension 57 into which the end portions of the shafts 51 and 55 extend, this sleeve 57 forming a bearing for shaft 51. Surrounding this sleeve 57 is a coiled spring 58 having its one end turned over and held at 59 in the wall of outer shell 50. At the free end of sleeve 57 is a collar 60 held by set screws 61 and which serves as a stop against which presses the coiled expansion spring 64 which tends to move forward the spring-contracting element 62 slidably mounted on sleeve-like element 57. The inner conically-shaped surface 63 of member 62 bears against the free end portion of main spring 58 and the action of spring 64 taken with the slanting surface 63 is such as to contract the free end portion of spring 58. The space 66 between spring 58 and cylindrical axial extension 57 may be considered to be of the order of several thousandths of an inch in practice.

The device of Fig. 4 operates in all material and substantial respects the same as the device of Fig. 1, but in this case the spring 58 contracts and binds upon a member within it. For some purposes, as where the greatest torque is desired to be developed a device along the general lines of Fig. 4 will be preferred.

When either shaft 51 or 55 is turned so as to cause spring 58 and extension 57 to move relative to each other in what may be termed the threading direction spring 58 is caused to expand, as in Fig. 1, but in the present case the result is to free the parts. It is when the relative movement in Fig. 4 is in the unthreading direction that the drag upon the spring causes it to tend to contract and hub the extension 57. The presser 62 maintains the free end portion of spring 58 in such close frictional contact with member 57 as to initiate the contraction on the slightest relative movement in the unthreading direction.

I contemplate as being included in these improvements all such changes, variations and departures from what is thus specifically illustrated and described as fall within the scope of the appended claims.

I claim:

1. A friction clutch, including co-axial driving and driven structures, a helical spring anchored at one end to one of said structures and adapted to frictionally grip circumferentially the other structure upon rotation of one of said structures in a certain direction relatively to the other structure a spring spreading means at the opposite end of said spring and secured to one of said structures, each of said structures having a cylindrical wall, the walls confining an annular space in which the helical spring is disposed, and the inner cylindrical wall extending over and engaging bearing-like an element of the other structure, whereby the two structures are firmly maintained in axial alinement.

2. A friction clutch, including co-axial driving and driven structures, a helical spring anchored at one end to one of said structures and adapted to frictionally grip circumferentially the other structure upon rotation of one of said structures in a certain direction relatively to the other structure a spring spreading means yieldingly forced against the other end of said spring and secured to one of said structures, each of said structures having a cylindrical wall, the walls confining an annular space in which the helical spring is disposed, and the inner cylindrical wall extending over and engaging bearing-like a cylindrical element of the other structure, which element is closer to the axis of the clutch than either of said walls, whereby the two structures are firmly maintained in axial alinement.

3. A friction clutch, comprising co-axial driving and driven structures, each fixedly connected with a shaft, one of said structures comprising a hub from which a cylindrical wall extends, a helical spring anchored in the hub of said structure and means mounted on said cylindrical wall in opposition to the free end of said spring for constraining said helical spring to expand, said cylindrical wall and hub combined with the spring and said constraining means forming a self-contained assembly adapted for axial insertion into a cavity of the other structure, said cavity being formed by two spaced cylindrical walls, of which last named cylindrical walls, upon assembly of the two structures, one is in telescoping journal-like engagement with the cylindrical wall of the other structure.

4. A friction clutch, comprising a driving structure and a driven structure, one of said structures consisting of a hub, and a cylindrical wall extending from said hub, said hub being adapted to be fixed to a shaft, a helical spring anchored to the hub and surrounding said cylindrical wall, a conical ring slidably mounted on said cylindrical wall and entering at its reduced end in the space between said spring and said wall, a collar secured to the free end of said cylindrical wall, and a spring interposed between said collar and said conical ring for constraining the ring to movement axially of the spring, the other structure of the clutch comprising two spaced cylindrical walls, a hub to which said concentric cylindrical walls are joined, the hub being fixed to a shaft which is supported in the inner cylindrical wall of said structure, said last named cylindrical wall having a diameter to fit telescopingly into the cylindrical wall of the first named structure whereby the two structures are firmly maintained in axial alinement after the first structure constituting a self-contained assembly has been telescoped over the inner cylindrical wall of the second named structure.

5. A friction clutch comprising a driving structure and a driven structure in axial alinement, each of said structures being fixed to a separate shaft, the ends of the shafts being disposed in the interior of the clutch, one of said structures being formed as a cylindrical housing to which the shaft is fixed in the end wall thereof, while the other structure is inserted into said housing at the open end thereof, said other structure having an inner cylindrical wall engaging in a manner of a bearing the end of the shaft which is fixed to the structure forming the cylindrical housing, a spring interposed between said housing and said other structure and anchored to said housing, and means on said cylindrical wall of the other structure for constraining said spring to engagement with said cylindrical wall.

WALTER CHARLES PITTER.